(12) United States Patent
Bowers

(10) Patent No.: US 6,892,838 B2
(45) Date of Patent: May 17, 2005

(54) STABILIZER BAR FOR INDEPENDENTLY SUSPENDED BEAM STRUCTURE

(75) Inventor: Lee N. Bowers, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 230 days.

(21) Appl. No.: 10/382,384

(22) Filed: Mar. 6, 2003

(65) Prior Publication Data

US 2003/0178816 A1 Sep. 25, 2003

Related U.S. Application Data

(60) Provisional application No. 60/362,770, filed on Mar. 8, 2002.

(51) Int. Cl.⁷ .............................................. B62D 55/00
(52) U.S. Cl. ........................................ 180/9.5; 180/9.1
(58) Field of Search ........................... 180/9, 9.21, 9.1, 180/9.26, 9.5, 9.54, 9.56, 9.58, 9.6, 192

(56) References Cited

U.S. PATENT DOCUMENTS

| | | | |
|---|---|---|---|
| 2,694,581 A | * 11/1954 | Helmle ....................... 180/9.54 |
| 3,521,527 A | 7/1970 | Gies et al. |
| 3,602,470 A | 8/1971 | Reynolds |
| 3,724,397 A | 4/1973 | Sargent |
| 3,856,325 A | 12/1974 | Willets |
| 3,894,597 A | 7/1975 | Wagner |
| 3,948,334 A | 4/1976 | Danielson et al. |
| 3,982,598 A | 9/1976 | Purcell et al. |
| 4,030,738 A | 6/1977 | Willetts |
| 4,043,417 A | 8/1977 | Orpana |
| 4,153,265 A | 5/1979 | McColl |
| 4,155,570 A | 5/1979 | Wiley, Jr. |
| 4,227,711 A | 10/1980 | Wheeler |
| 4,360,220 A | 11/1982 | Beers |
| 4,364,443 A | 12/1982 | Sato et al. |
| 4,429,898 A | 2/1984 | Bedenbender et al. |
| 4,516,649 A | 5/1985 | Braathen |
| 4,519,654 A | 5/1985 | Satzler et al. |
| 4,582,153 A | 4/1986 | Shinsen |
| 4,811,972 A | 3/1989 | Wiley, Jr. |
| 4,923,257 A | 5/1990 | Purcell |
| 4,951,767 A | * 8/1990 | Keagbine ................... 180/9.52 |
| 4,974,684 A | 12/1990 | Stevens |
| 4,987,965 A | 1/1991 | Bourret |
| 5,016,905 A | 5/1991 | Licari |
| 5,064,011 A | 11/1991 | Ogano et al. |
| 5,076,378 A | 12/1991 | Lagace |
| 5,113,958 A | 5/1992 | Holden |
| 5,293,948 A | 3/1994 | Crabb |
| 5,409,075 A | * 4/1995 | Nieman ....................... 180/9.5 |
| 5,482,326 A | 1/1996 | Levi |
| 5,566,773 A | 10/1996 | Gersmann |
| 5,575,347 A | 11/1996 | Uchibaba et al. |
| 5,791,681 A | 8/1998 | Van Denberg |
| 5,975,226 A | 11/1999 | Matsumoto et al. |
| 6,012,724 A | * 1/2000 | Pitkanen ................... 280/6.155 |
| 6,076,619 A | * 6/2000 | Hammer ..................... 180/6.48 |

* cited by examiner

*Primary Examiner*—Tony Winner
(74) *Attorney, Agent, or Firm*—Rankin, Hill, Porter & Clark LLP; Christen Millard

(57) ABSTRACT

A half-track multi-use vehicle having an independent suspension system that reduces body roll during operation in rough or sloping terrain. The vehicle includes a frame, a pair of beams that each holds mid and rear wheels, and a suspension system extending between the each beam and the frame. The suspension system includes a plurality of cushions and a stabilizer bar. The stabilizer bar is secured to each beam at a predetermined position between the mid and rear wheels. The predetermined position is selected such that each wheel's wheel rate, which is the combined spring rate contributed by an associated cushion and the stabilizer bar, is equal.

24 Claims, 4 Drawing Sheets

STABILIZER BAR FOR INDEPENDENTLY SUSPENDED BEAM STRUCTURE

This application claims the benefit of U.S. Provisional Application No. 60/362,770 filed Mar. 8, 2002.

BACKGROUND OF THE INVENTION

1. Field of the Invention

The present invention generally relates to vehicle suspension systems and, more particularly, toward a stabilizer bar for an independently suspended beam structure in a tracked vehicle suspension.

2. Description of Related Art

It is known to independently suspend wheels from a vehicle frame. An independently suspended wheel is able to move in one or more directions without affecting the movement of any other wheels. It is desirable to independently suspend wheels to improve the ride of the vehicle when traveling over a road or ground that may be uneven. It is also desirable to use a track on each side of the vehicle. The use of a track, rather than individual wheels only, improves the vehicle's flotation on soft ground as well as the traction. It is particularly important to use an independent suspension system when a track is used, to maximize the amount of surface area of each track in contact with the ground on each side of the vehicle.

It is also known to suspend beams from vehicles. In a typical configuration, a beam is suspended on each side of a vehicle. Two or more wheels are attached to the beam. Typically, the beams are rigidly interconnected by one or more axles or other structures so that the beams move together relative to the frame. These types of structures are normally used in areas where the terrain is likely to be substantially level.

Some suspension systems are like those used on military vehicles and are schematically illustrated in FIG. 1. This half-track structure 10 includes a track 12 that surrounds a plurality of wheels 14, 16. The two end wheels 14 are mounted directly to the frame with no suspension system. The main load-bearing wheels 16 are individually suspended from the frame.

Other suspension systems are used on vehicles similar to the SNO CAT vehicle, which is made by Tucker Sno Cat Corporation of Oregon, and schematically illustrated in FIG. 2. This half-track structure 20 includes a track 22 surrounding a plurality of wheels 24, 26. The top wheel 24 is connected to a central axle 28. The central axle 28 provides the drive function and is suspended from the vehicle. The remaining wheels 26 are attached to the central axle 28. The track 22 can rotate about the central axle 28, but the central axle links the motion of the two structures 20 on either side of the vehicle.

Finally, there is a multi-use vehicle (MUV) suspension system, such as is schematically illustrated in FIG. 3. In this structure 30, a trailing arm 32 is attached to each beam 34 (only one beam shown in the drawing) and connects the beam to a frame (not shown). While each beam may include its own springs or cushions 36, the axles 38 conventionally extend across the vehicle, thereby linking the motion of the two beams.

Such structures are unsatisfactory for use in an off-road setting. Typically, an MUV is used in an area where there are substantial differences in terrain on both sides of the vehicle. It is also desirable to use a half-track on an MUV to permit the MUV to traverse many types of terrain, particularly in wet areas, without sinking. However, no structure has been developed that permits each beam to be independently suspended. In an MUV setting, an independent suspension would be particularly desirable since the variations in the level of the ground can be substantial.

None of the suspension systems known in the art and described hereinbefore are acceptable for use on an MUV. Specifically, none of the known systems provide an independent suspension for a half-tracked vehicle wherein the vehicle is adapted to minimize body roll, as may be encountered during turns or operation of the vehicle over rough or sloping terrain. Therefore, there exists a need in the art for a suspension system adapted for use on a half-track MUV. There further exists a need in the art for an MUV suspension that reduces body roll experienced by the vehicle during off-road operation.

SUMMARY OF THE INVENTION

The present invention is directed toward an improved suspension system adapted for a half-track MUV that reduces or minimizes the problems in the art. The present invention is further directed toward an MUV suspension that reduces body roll experienced by the vehicle during off-road operation.

In accordance with the present invention, a half-track vehicle includes a frame, first and second beams, first and second suspension systems associated with the first and second beams, respectively, and a stabilizer bar.

In further accordance with the present invention, each of the first and second beams holds mid and rear wheels and each of the first and second suspension systems includes first and second cushions. The first and second cushions extend between the frame and the associated beam, and are secured to the associated beam adjacent to the mid and rear wheels, respectively. The first and second suspension systems are substantially independent of one another to permit either of the first and second beams to move relative to the frame without affecting the other of the first and second beams.

In further accordance with the present invention, the stabilizer bar is secured to each of the first and second beams at a predetermined location between the mid and rear wheels. The predetermined location is established such that the wheel rate for each of the mid and rear wheels, which is the combined spring rate of the associated cushion and the spring rate applied by the stabilizer bar, is substantially equal.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
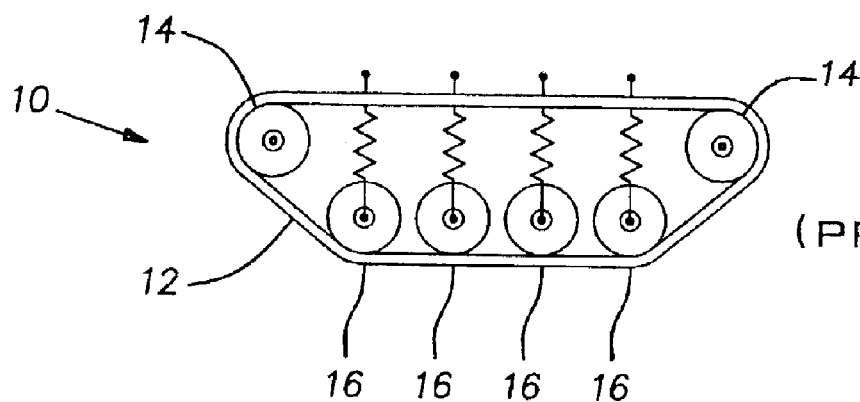
FIG. 1 is a schematic side view of a first prior art half-track suspension structure.
Figure 2:
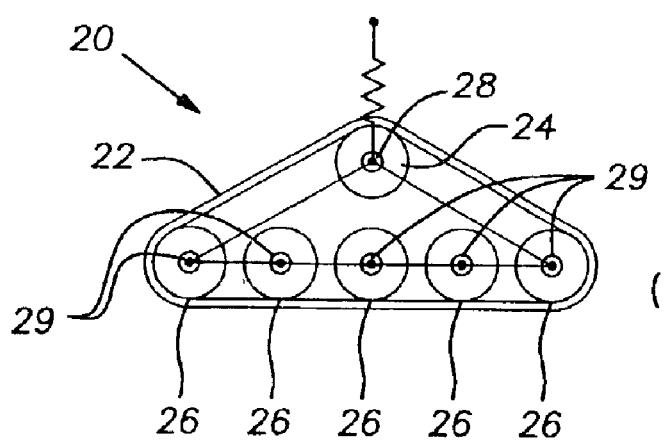
FIG. 2 is a schematic side view of a second prior art half-track suspension structure.
Figure 3:
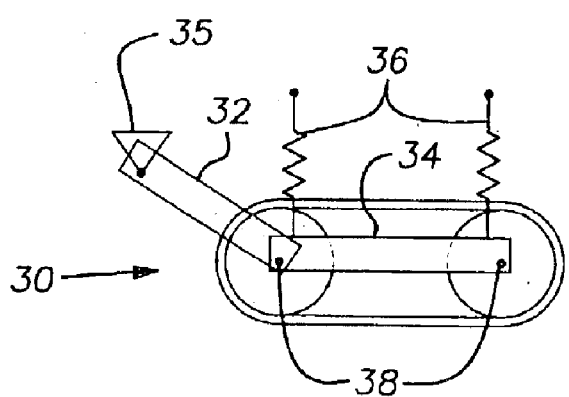
FIG. 3 is a schematic side view of a third prior art half-track suspension structure.

The present invention relates to a suspension system for a half-track vehicle. Initially, it is noted that the drawings are not to scale, but will be more easily understood by a person of ordinary skill in the art than drawings from another perspective or drawings shown in proper proportion. It is further noted that the drawings do not show any other structures attached to the vehicle, nor do they show any structures necessary for the functioning of the vehicle that are not directly related to the suspension structure disclosed. Accordingly, the vehicle shown in the drawing figures may not be functional without the other parts, such as a drive train and the like. However, any drive train that may be used in connection with the present structure is relatively conventional in nature. A person of ordinary skill in the art can easily adapt a known MUV drive train for use in connection with the present vehicle. Further, as the drawings only depict the rear portion of the vehicle, the conventional front or steered wheels are not shown herein.

Figure 4:
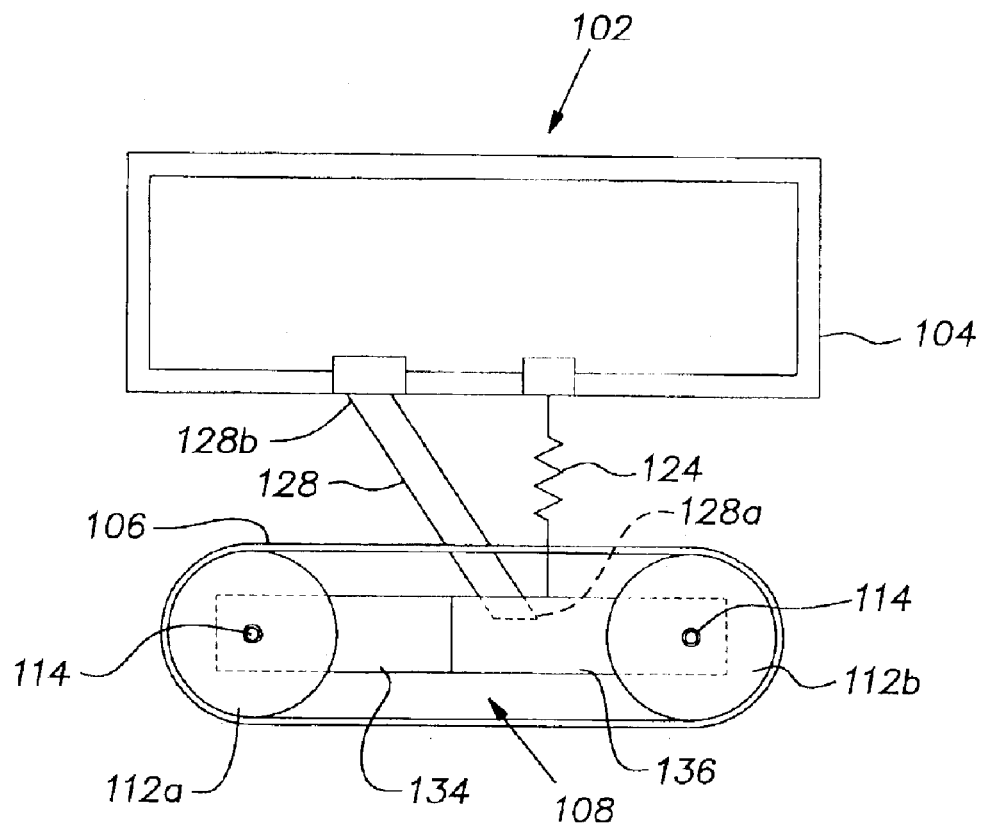
FIG. 4 is a schematic side view of an embodiment of a half-track suspension structure and vehicle in accordance with the present invention.
Figure 5:
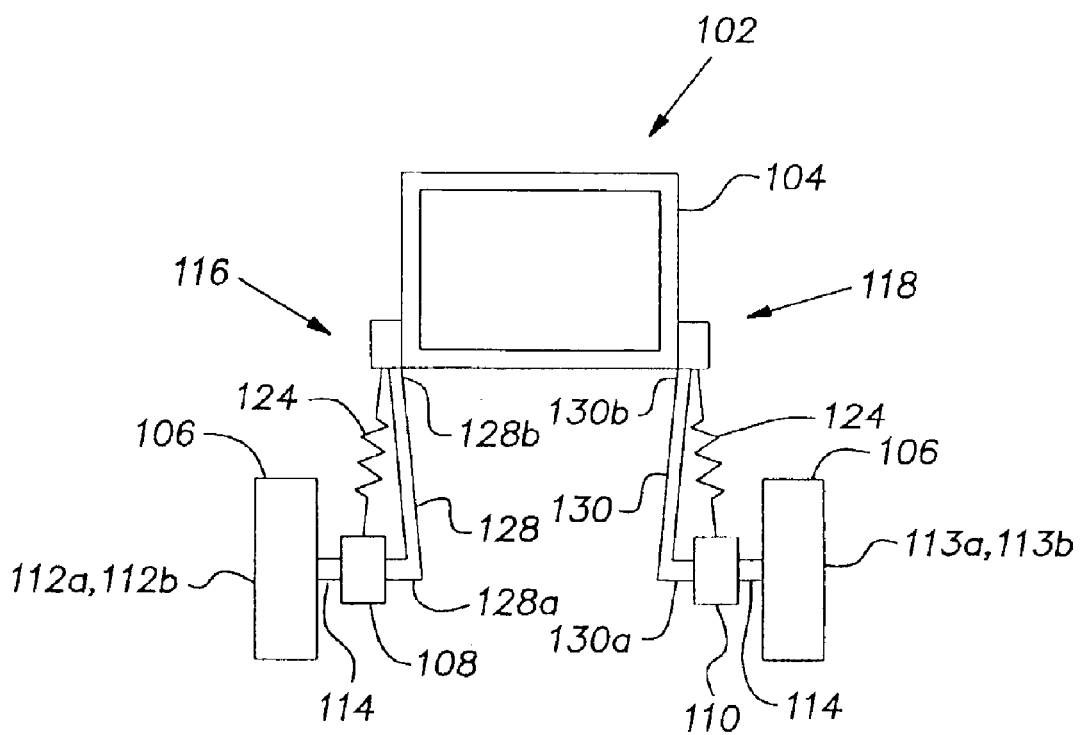
FIG. 5 is a schematic end view of the vehicle shown in FIG. 4.

FIGS. 4 and 5 schematically illustrate a half-track vehicle according to first embodiment of the present invention. The half-track vehicle 102 includes a frame 104, a pair of tracks 106, first and second beams 108, 110, a plurality of wheels 112a, 112b, 113a, 113b, a plurality of cushions 124, and first and second trailing arms 128, 130. The wheels are associated with one of a first and second lateral side 116, 118 of the vehicle 102 and are referred to hereinafter as being either a mid wheel 112a, 113a or a rear wheel 112b, 113b, respectively. Preferably, the rear wheels 112b, 113b are powered by known drive means (not shown), as will be apparent from the following discussion. Alternatively, the mid wheels 112a, 113a could be powered. Further, both the mid and rear wheels could be powered, either directly or indirectly via a drive chain, as is known in the art.

Each of the wheels 112a, 112b on the first lateral side 116 of the frame 104 is connected to the first beam 108, while each of the wheels 113a, 113b on the second or opposite lateral side 118 of the frame 104 is connected to a second beam 110. An axle 114 is associated with each of the wheels. The axles 114 are secured to the beams 108, 110 and extend outwardly therefrom, with the associated wheel being secured to an end of the axle, as is well known in the art. Naturally, if the rear wheels are powered, the rear axles will extend inwardly from the beam for connection to the drive means (not shown). Each of the axles 114 in the illustrated embodiment extend only between one of the beams 108, 110 and the associated wheel 112a, 112b, 113a, 113b such that no single axle interconnects wheels on the first and second sides 116, 118 of the vehicle.

Each beam 108, 110 is preferably made from two parts 134, 136 that slidably interfit with one another. In order to place the wheels within the track, the wheels 112a, 112b, 113a, 113b are attached to the axles 114, which are each secured to one of the beam parts 134, 136, and the two beam parts 134, 136 are slidably interfit with one another. The track 106 is then placed around the wheels, and the two parts 134, 136 are slid away from each other until the track 106 has the desired tension. Thereafter, the two beam parts 134, 136 are attached to one another using conventional techniques, such as mechanical fasteners.

Because it is often desirable to make the beams of steel for strength and durability, the two beam parts 134, 136 may be joined by welding, and an additional track-tensioning device (i.e., one associated with just one of the beam portions 134, 136) may be used to adjust the track tension which varies over time, due to age, use, humidity, and the like. Therefore, although the sliding feature and joining techniques described hereinbefore are illustrative of the preferred embodiment, the present invention is not limited thereto. Rather, it is believed apparent that many other structures and methods may be used to properly position and tension the track 106 on the wheels. In addition, while the use of the track 106 is desirable, it is not necessary, and the independently suspended beam structure can be used only with the wheels should the track be omitted.

A suspension system connects the beams 108, 110 to the frame 104 and permits the beams on each side of the frame to move relative to the frame and substantially independently of one another. The suspension system includes the cushions 124 and the trailing arms 128, 130.

With continuing reference to FIGS. 4 and 5, one of the cushions 124 extends between the first beam 108 and the frame 104, while an identical cushion 124 extends between the second beam 110 and the frame 104. Alternatively, a pair of cushions could be used on each side 116, 118, wherein one of the cushions will be disposed adjacent the mid wheel 112a, 113a, while another of the cushions will be disposed adjacent the rear wheels 112b, 113b. Each of the cushions 124 shown in FIGS. 4–5 acts as a spring that resists compression and tension, and thus serves to dampen vertical movement of the frame and beams relative to one another. Naturally, any known cushioning mechanism can be used, such as a shock absorber, hydraulic system, or the like, depending on the level of strength and durability needed. A person of ordinary skill in the art is able to select an appropriate structure for cushioning the movement of any particular beam structure.

The first trailing arm 128 is on the first side 116 of the vehicle and extends between the first beam 108 and the frame 104. The second trailing arm 130 is on the second side 118 of the vehicle and extends between the second beam 110 and the frame 104. More specifically, the trailing arms 128, 130 include a first end 128a, 130a pivotally secured to the associated beam 108, 110, respectively, and a second end 128b, 130b pivotally secured to the frame 104.

The pivotal connection between the trailing arm first end 128a, 130a and the beam 108, 110, on one hand, and between the trailing arm second end 128b, 130b and the frame 104, on the other hand, preferably is a swivel-type ball-and-socket type connection that permits the up, down, left and right motion of the trailing arm relative to the beam and frame. The connection may be made by rubber bushings, which are known in the art and provide the desired limited three degrees of freedom. While most of the rotary motion at the connections will be in vertical direction as the beam 108, 110 moves upward and downward relative to the frame 104, a certain degree of horizontal pivoting, or a certain degree of movement including a horizontal component, may be desirable should the beams twist or cant during use. In addition to permitting a certain range of motion between the frame 104 and the beams 108, 110, the trailing arms 128, 130 also serve as the primary paths for transmitting driving force from the track structure to the frame 104, and therefore are relatively rigid. Accordingly, the trailing arm 128, 130 and the trailing arm joints or connections must be sufficiently strong to bear the forces communicated therethrough.

Because each of the first and second beams 108, 110 is separately joined to the frame 104 and is not joined to the other of the first and second beams 108, 110, the first and second beams are permitted to move independently of each other. Thus, one of the beams 108, 110 may raise/dip and rebound without causing the frame to twist due to the other beam 110, 108 simultaneously dipping/raising and rebounding.

It is noted herein that the illustration of the present invention in FIGS. 4 and 5 is somewhat schematic and should not be taken too literally. For example, in the drawings the beams 108, 110 are positioned entirely below the frame 104. This depiction is for ease of understanding. The beams 108, 110 can be positioned nearer to and partially overlapping the frame 104. In addition, the frame 104 is shown as being generally rectangular with a square cross section. The frame 104 need not have such a geometric shape. In addition, the frame 104 may include any number of crossbars, rather than or in addition to the end cross bars shown. The cushions 124 and the trailing arms 128, 130 are shown as being attached near the bottom of the frame 104. However, the cushions 124 and the trailing arms 128, 130 need not be so positioned, but may instead be attached to the frame 104 at any convenient location.

Figure 6:
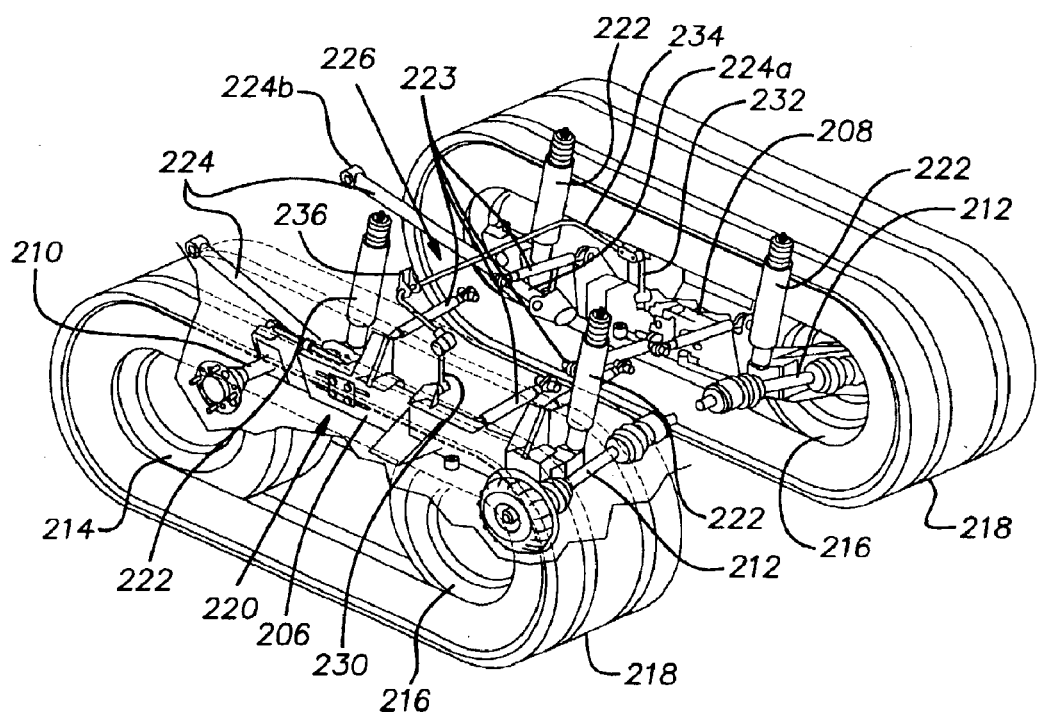
FIG. 6 is a perspective view, partially cut away, of a modified embodiment of a half-track suspension structure.

Turning now to FIG. 6, a portion of a half-track vehicle incorporating a particular configuration of a suspension system according to the present invention is illustrated, it being noted that the vehicle frame has not been shown in the drawing for purposes of clarity. Moreover, insofar as the structure on each lateral side of the half-track vehicle is identical, the following description is directed toward only one side, where appropriate, for purposes of brevity.

With reference to FIG. 6, a beam and track structure includes first and second beams 206, 208, a mid axle 210, a rear or drive axle 212, mid and rear wheels 214, 216, and a track 218. The first and second beams 206, 208 are preferably two-piece assemblies, as described hereinbefore, that are slidably interfit with one another, and secured in a desired position by a fastening assembly 220.

Each mid axle 210 is secured to the associated beam 206, 208, extends outwardly therefrom, and has one of the mid wheels 214 rotatably secured at a distal or outer end thereof. Each rear axle 212 has an inner end that is operatively connected to a drive means (not shown) and an outer end extending through the associated first or second beam 206, 208. The rear or drive wheel 216 is affixed to the outer end of the rear axle 212 for rotation therewith. The track 218 extends around the mid and rear wheels 214, 216 and transmits driving force from the rear wheel 216 to the mid wheel 214.

A suspension system extends between the beams 206, 208 and the frame (not shown) generally in the manner described hereinbefore with regard to the first embodiment of the present invention. For each beam, the suspension system includes first and second cushions 222, three transverse support arms 223, a trailing arm 224, and a stabilizer bar 226.

One of the cushions 222 is secured to each associated beam 206, 208 adjacent the mid wheel 214 while another cushion 222 is secured to each beam adjacent the rear wheel 216. The cushions 222 support the weight of the vehicle and any load contained thereon, and also serve to dampen relative vertical motion between the frame and the beams 206, 208. In addition to the vertical motion inherently accommodated by the cushions 222, the cushion upper and lower ends are preferably attached to the frame and beam, respectively, with a pivotal connection that will permit some range of non-vertical motion between the beam and frame.

The transverse support arms 223 extend laterally from the beam 206, 208 to the frame, and preferably include swivel-type ball and socket type connections at each end to permit movement of the beam relative to frame, generally in a vertical direction but also movement in directions having non-vertical components. The transverse support arms 223 provide camber and toe control of the track belt 218, in conjunction with the trailing arm 224.

Each trailing arm 224 is secured to one of the beams 206, 208 at a location between the mid and rear wheels 214, 216, and extends therefrom to the frame. Each trailing arm 224 includes a lower end 224a and an upper end 224b. The lower end 224a is pivotally secured to the beam 206, 208 so as to permit the trailing arm 224 to rotate vertically, while the upper end 224b is connected to the frame with a swivel or ball-and-socket type connection to permit the trailing arm 224 to rotate in a vertical and in a non-vertical direction to accommodate slight misalignment between the beam 206, 208 and frame, as may occur during operation of the vehicle.

The stabilizer bar 226 extends from a central area of one beam 206 to a similar central area on the opposite beam 208. As will be apparent from the following discussion, the stabilizer bar 226 is preferably attached to each beam 206, 208 at a location midway between the mid and rear wheels 214, 216.

More specifically, the stabilizer bar 226 includes a pair of upright support bar portions 230, 232 and a transverse, generally u-shaped connecting bar portion 234. Each upright support bar portion 230, 232 includes a lower end and an upper end. The lower end of the upright support bar 230, 232 is pivotally connected to the beam 206, 208, whereas the upper end of the upright support bar 230, 232 is pivotally connected to the free end of the u-shaped connecting bar 234, as illustrated. At a pair of spaced apart locations, the u-shaped connecting bar 234 is rotatably secured to the frame by bushings secured in mounting brackets 236.

The stabilizer bar 226 helps to counteract body roll, such as may occur when the vehicle is turned or when the vehicle is operated on a slanting surface. During such operation, the cushions 222 on one side of the vehicle expand or extend, causing the frame on that side of the vehicle to move away from the associated beam 206, 208. Since each upright support arm 230, 232 is connected between one of the beams 206, 208 and one of the free ends of the u-shaped connecting bar 234, the connecting bar 234 twists or rotates when one of the upright support arms moves vertically. The connecting bar transmits such torsional forces to the other upright support arm 232, 230, and thus forces the other side of the frame to move upwardly, which tends to expand or extend the cushions 222 on the other side of the vehicle. Accordingly, when the frame on one side of the vehicle moves upwardly (or downwardly) relative to one associated beam 206, 208, the stabilizer bar 226 forces the frame on the other side of the vehicle to move upwardly (or downwardly) relative to the other associated beam 208, 206. Thus, the stabilizer bar 236 serves as a spring-like element that imparts a biasing force between the frame and the beams 206, 208, and helps to resist one side of the frame from moving vertically relative to the other side of the frame.

As will be apparent from the following discussion, the effective connection between the beams 206, 208 is limited in practice by the placement or location of the stabilizer bar 226 along the length of the beams 206, 208. With that in mind, since the beams 206, 208 are attached to two wheels 214, 216, the beams will not be subject to the same upward motion along their lengths. Rather, when the illustrated mid wheel 214 contacts a small obstacle, such as a rock or stick, the associated beam 206, 208 will deflect in a generally clockwise direction. Similarly, when the rear wheel 216 contacts a similar small obstacle, the associated beam 206, 208 will deflect in a generally counterclockwise direction. It is desirable to allow sufficient rotation in the stabilizer bar joints to permit such deflection without affecting the opposite-side beam.

Positioning the stabilizer bar 226 in the central area of the beams 206, 208 (i.e., midway between the wheels 214, 216) will minimize effects from these shocks. However, when the entire beam 206, 208 is subject to deflection, the stabilizer bar 226 will function in a desirable fashion, as described herein.

More specifically, the illustrated configuration and disposition of the stabilizer bar 226 offers an improved wheel rate. The wheel rate is the combined spring rate on the wheel 214, 216 from the cushions 222 and the stabilizer bar 226. The spring rate is the force with which a spring pushes on another object.

Figure 7A:
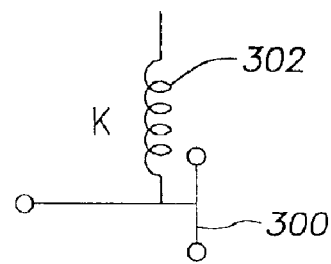
FIGS. 7a–7d are diagrams relating to the present invention.

Generally, and with reference to FIG. 7a, for a wheel 300 having only one spring 302 (i.e., without a stabilizer bar) disposed in direct vertical alignment with the wheel 300, the wheel rate F is essentially proportional to the spring rate K. Similarly, and with reference to FIG. 7b, for a structure consisting of a pair of wheels 300 on a beam 308, each having a spring 304, 306 substantially at its axle joining the wheel 300 to the beam 308, the wheel rate $F_1$, $F_2$ for each wheel 300 will be substantially the spring rate $K_1$, $K_2$ of the spring 304, 306 located adjacent the respective wheel 300. The spring rates for the respective springs $K_1$, $K_2$ may be the same or may be different, giving different wheel rates for the respective springs. It will be apparent to a person of ordinary skill in the art that if either spring is not placed directly over the axle, the spring rate for that spring will be distributed between the two wheels. That equation is a matter of geometrical calculation and is not discussed in detail here or in connection with FIG. 7d below.

Figure 7B:
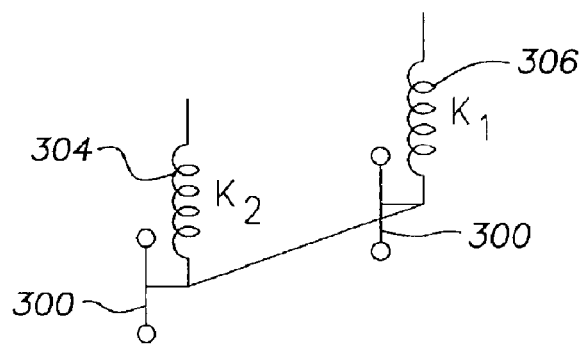
Figure 7C:
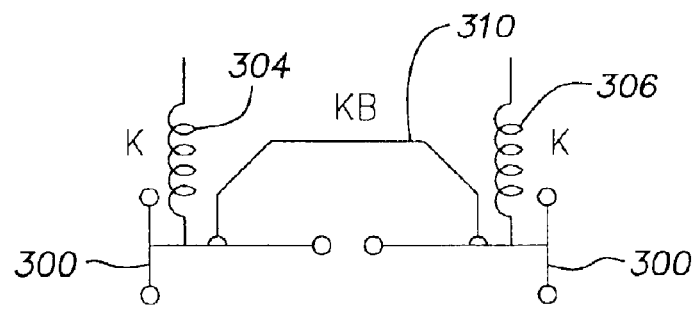

With reference to FIG. 7c, for a configuration consisting of first and second wheels 300, first and second springs 304, 306, and a stabilizer bar 310 interconnecting the wheels 300, the springs 304, 306 act with the stabilizer bar 310 essentially as springs in series. Accordingly, the equation for determining the wheel rate is:

$$F = K + (K \cdot K_B)/(K + K_B) \quad (1)$$

wherein K is the spring rate for each spring 304, 306, and $K_B$ is the spring rate for the stabilizer bar 310. Therefore, if we assume that the spring rate K for each spring 304, 306 is 25 kN/m and the spring rate $K_B$ for the stabilizer bar 310 is 10 kN/m, the wheel rate F for one wheel moving will be 32 kN/m. This represents an increase in the wheel rate of 7 kN/m when the stabilizer bar 310 is added.

Figure 7D:
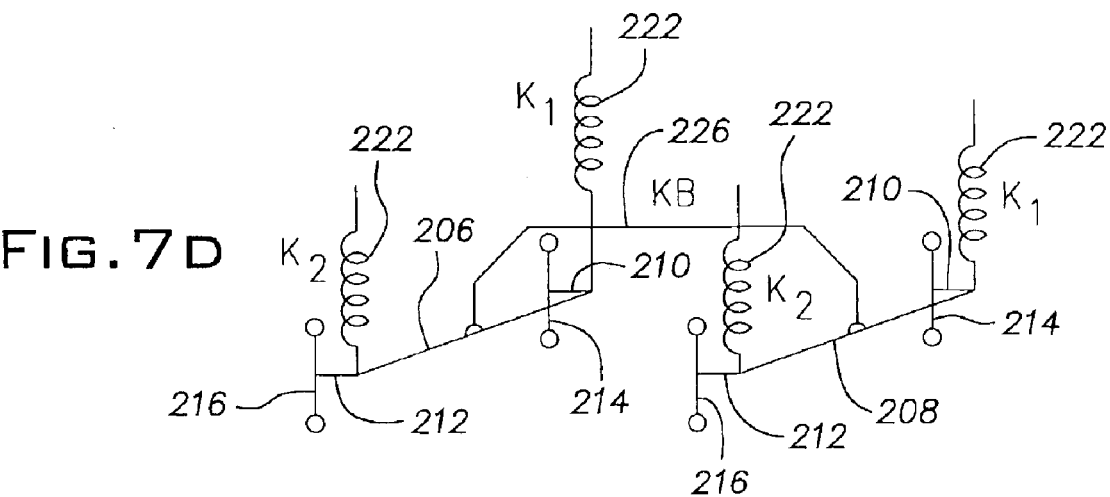

Finally, FIG. 7d schematically illustrates a configuration generally similar to that of the present invention, but simplified for ease of calculation. In the present invention, there are two wheels 214, 216 on each beam 206, 208, each of which has a spring 222 substantially at the location where the axle 210, 212 meets the beam 206, 208. The stabilizer bar 226 is attached to the beams 206, 208 between the wheels 214, 216.

If the stabilizer bar 226 were attached to the beams 206, 208 at one end or the other of the beam (i.e., closer to one wheel than the other), the wheel rate of the wheel closer to the stabilizer bar would resolve to be substantially the rate calculated in connection with FIG. 7c above and the wheel rate for the other wheel on the same beam would be calculated as described hereinbefore in connection with FIG. 7b. However, since the stabilizer bar is attached in a central portion of the beam 206, 208, the spring rate KB for the stabilizer bar is distributed between the two wheels, based on the position of the stabilizer bar relative to the wheels.

The equation for determining the wheel rate $F_1$, $F_2$ for each wheel when the stabilizer bar is located in the central portion of the beam is:

$$F_1 = K_1 + A(2K \cdot K_B)/(K_B + 2K_1) \quad (2)$$

$$F_2 = K_2 + B(2K_2 \cdot K_B)/(K_B + 2K_2) \quad (3)$$

In the simplest case, we will assume that $K_1$ and $K_2$ are both 25 kN/m. We will also assume that the stabilizer bar 226 is positioned exactly in the center of the beam 206, 208 and that the spring rate KB of the stabilizer bar 226 is 10 kN/m. The factors A and B are factors that are indicative of the position of the stabilizer bar 226 on the beam. Since the stabilizer bar 226 is in the middle of the beam in this example, A and B are both ½, i.e., 50% (0.5) of the spring rate $K_B$ of the stabilizer bar is contributed to the wheel rate $F_1$, $F_2$ at each wheel 214, 216. In this case, the wheel rate $F_1$, $F_2$ for each wheel will be equal to 29.2 kN/m. This represents an increase to each wheel of 4.2 kN/m, which is approximately half of the increase when the stabilizer bar 226 is used immediately adjacent one of the wheels.

It is desirable that the wheel rate $F_1$, $F_2$ of each of the wheels 214, 216 be equal. This creates optimal performance when the vehicle is going around a corner or in another potential rollover situation. Accordingly, if the spring rates $K_1$, $K_2$ of the two springs are different, the position of the stabilizer bar 226 can be adjusted to cause the wheel rates F1 and $F_2$ to be the same. As an example, suppose that K1 is 20 kN/m, $K_2$ is 25 kN/m, and $K_B$ is 10 kN/m. Inserting these values in the equations for F1 and $F_2$, we can determine that A=0.82 and B=0.18. This means that the stabilizer bar 226 must be positioned to provide 18% of its spring rate $K_B$ to the spring having the $K_2$ spring rate and 82% of its spring rate $K_B$ to the spring having the K1 spring rate, in order to equalize the wheel rates $F_1$, $F_2$. If the beams 206, 208 were 100 units long, the stabilizer bar 226 would best be positioned 18 units from the end having the K1 spring rate and 82 units from the end having the $K_2$ spring rate. Solving the original equation, the wheel rate $F_1$, $F_2$ is about 26.5 kN/m. This represents an increase of only 1.5 kN/m for the wheel rate $F_2$ and 6.5 kN/m for the wheel rate F1.

More complex systems can be envisioned, such as a system where one or both of the springs 222 are not placed directly over one or both of the wheels 214, 216. In such a case, the contribution of the spring positioned more centrally to each of the wheels must be considered, in addition to the other factors. In addition, a larger number of springs 222 could be used, and the effects of these too must be taken into consideration.

This positioning of the stabilizer bar minimizes deflection of the stabilizer bar 226 when it is undesirable, such as when there is an impact that affects only one of the wheels 214, 216. Because the stabilizer bar 226 is not positioned directly over the wheel 214, 216, during such impact only a portion of its spring force is imparted to the wheel 214, 216 and delivered to the opposite beam. This allows for an improved ride condition, in that smaller deflections affecting only one wheel will be less likely to affect the ride substantially. Only when the vehicle is in a turn or possible roll-over condition will the effect of the stabilizer bar 226 be significant and be used to the desired extent.

Although the inventive suspension has been described in the foregoing in use on a motorized vehicle, it is considered apparent that the suspension system is capable of use on a trailer that has no independent motive power. The use of the inventive suspension on a trailer would be useful in situations wherein the trailer is used in offroad applications, such as in agriculture, logging, or the like. In such agricultural applications, it is important to minimize the pressure on the ground from the trailer, to prevent damaging crops or compacting the soil.

Another area in which a trailer would be useful occurs when the trailer is to be used on snow or in a muddy area, particularly if there is rough terrain. In these cases and similar situations, the use of a tracked vehicle distributes the weight of the trailer, minimizing the weight in any one particular area. In such a situation, the independent suspension to be described below remains important, due to the inherent unevenness of the terrain. However, no motive power need be used, since the trailer will be pulled by another, powered vehicle. Accordingly, there is no absolute necessity for a drive train assembly to be used in connection with the present vehicle.

The structure shown as suspending the beam from the frame, namely, the cushions and the trailing arms, are shown only as an example, and can be easily modified by a person of ordinary skill in the art. A person of ordinary skill in the art can easily add additional cushions and change the relative locations of the cushions and the trailing arms. For example, although the trailing arms have been shown secured to about a middle portion of its associated beam, it is contemplated that the trailing arm be located closer to one of the ends of the beam, for purposes disclosed hereinbefore.

Furthermore, additional suspension components or parts may be added to, or substituted for, those described hereinbefore. For example, a standard A-arm, half shafts, and various arms may be employed. The number and position of these can be modified in a variety of ways in order to permit movement by the beam in three dimensions and the particular configuration desirable for a particular application will vary depending on the desired strength and durability necessary. For example, although the stabilizer bar is shown as a multi-piece construction herein, it is contemplated hat the stabilizer bar could likewise be formed in one piece.

Moreover, the present invention is not limited to the track and tires particularly described herein, it being considered apparent that numerous equivalent structures can be substituted therefor. For example, any type of track may be used with the present configuration, such as a steel track or a rubber track, may be used. If a steel track is used, it is desirable to attach rubber blocks or ridges to the surface of the track, as is conventional. If a rubber track is used, it is desirable to form ridges or other track patterns on the outer surface of the track. In addition, guides, typically referred to as "gaiters", may be included on the track. These are a series of spike-like elements that project from the inner surface of the track toward the wheel. These are used on the outside of the wheel, and on each side of the wheel to better secure the wheel in the track. Alternatively, one guide can be used between two tires for the same purpose. If the track is made from rubber, it is desirable to use some sort of reinforcement within the track. The reinforcement should have both longitudinal and transverse components. Accordingly, the reinforcements may run along both the width and the length of the track, or be oriented at a 45-degree angle to the longitudinal axis of the track. The reinforcements may take the form of fiber reinforced plastic rods, or cords or cables made of plastic, Kevlar, or other appropriate materials.

The tires may be pneumatic, steel, or solid plastic or rubber. Pneumatic tires tend to generate an improved ride. In the preferred embodiment, the tires are pneumatic, while the track is made from rubber, preferably having a thickness of about one-inch. Finally, it is desirable to use a tread pattern or ridges of some sort on the outside of the tread for better traction by the track.

What is claimed is:

1. A half-track vehicle, comprising:
   a frame having a first side and a second side;
   a first beam;
   a second beam;
   a first suspension system suspending the first beam from the frame adjacent the first side of the frame;
   a second suspension system substantially separate from the first suspension system suspending the second beam from the frame adjacent the second side of the frame; at least one wheel attached to each beam; and
   a stabilizer bar attached to a central area of each beam, said stabilizer bar extending between said beams and being operable to limit body roll when one of said first and second beams moves vertically relative to said frame.

2. The vehicle according to claim 1, wherein each of said first and second suspension systems includes a cushion that serves to dampen relative vertical movement of said frame relative to said first and second beams.

3. The vehicle according to claim 2, wherein each of said first and second suspension systems includes a trailing arm that extends between said frame and said first and second beams so that driving forces imparted to said beams cause said frame to move with said beam.

4. The vehicle according to claim 2, wherein a mid wheel and a rear wheel are attached to each of said first and second beams.

5. The vehicle according to claim 4, wherein each of said wheels has a cushion associated therewith and an associated wheel rate, and wherein said stabilizer bar is connected to said first and second beams at a predetermined location, said predetermined location being spaced a first distance from said mid wheels and a second distance from said second wheels.

6. The vehicle according to claim 5, wherein said first and second distances are equal.

7. The vehicle according to claim 5, wherein said first and second distances are different from one another, and are selected such that a resulting wheel rate of each wheel is substantially equal.

8. The vehicle according to claim 5, wherein the cushion associated with the mid wheels has a first spring rate and the cushion associated with said rear wheels has a second spring rate.

9. The vehicle according to claim 8, wherein said first spring rate is equal to said second spring rate.

10. The vehicle according to claim 8, wherein said first spring rate is different than said second spring rate.

11. The vehicle according to claim 9, wherein said stabilizer bar has a spring rate, and wherein a wheel rate, which is the spring rate on each wheel applied by the associated cushion and the stabilizer bar, is equal for each of the wheels.

12. The vehicle according to claim 10, wherein said stabilizer bar has a spring rate, and wherein a wheel rate, which is the spring rate on each wheel applied by the associated cushion and the stabilizer bar, is equal for each of the wheels.

13. The vehicle according to claim 12, wherein for each wheel, the spring rate applied by the stabilizer bar is dependent upon the distance the stabilizer is spaced from the wheel along the beam.

14. The vehicle according to claim 2, wherein said first suspension system includes a first trailing arm extending between said frame and said first beam and said second suspension system includes a second trailing arm extending between said frame and said second beam, said first and second trailing arms causing said frame to move horizontally with said beams.

15. The vehicle according to claim 14, wherein a mid wheel and a rear wheel are attached to each of said first and second beams and said first and second trailing arms are secured to said first and second beams at locations between said mid and rear wheels.

16. The vehicle according to claim 15, wherein said stabilizer bar is a multi-piece assembly.

17. A vehicle having a suspension system, comprising:
a frame having a first side and a second side;
a first beam;
a second beam;
a first mid wheel and a first rear wheel associated with said first beam and over which a first tracked belt is rotatably driven;
a second mid wheel and a second rear wheel associated with said second beam and over which a second tracked belt is rotatably driven;
wherein said suspension system comprises:
a first suspension system suspending the first beam from the frame adjacent the first side of the frame, said first suspension system including a first cushion extending between said first beam and said frame and being secured to said first beam adjacent said first mid wheel, a second cushion extending between said first beam and said frame and being secured to said first beam adjacent said first rear wheel;
a second suspension system substantially separate from the first suspension system and suspending the second beam from the frame adjacent the second side of the frame, said second suspension system including a third cushion extending between said second beam and said frame and being secured to said second beam adjacent said second mid wheel, and a fourth cushion extending between said second beam and said frame and being secured to said second beam adjacent said second rear wheel; and,
a stabilizer bar having a first end and a second end, said stabilizer bar first end being attached to the first beam at a location between said first mid wheel and said first rear wheel, said stabilizer bar second end being attached to said second beam at a location between said second mid wheel and said second rear wheel, wherein said stabilizer bar is rotatably secured to said frame at a location intermediate said stabilizer bar first and second ends and, when only one of said first and second beams moves vertically relative to said frame a predetermined amount, said stabilizer bar is operable to transmit torsional force to the other of said first and second beams and thereby limits body roll of said vehicle.

18. The vehicle according to claim 17, wherein said stabilizer bar first end is spaced a first distance from said first mid wheel and a second distance from said first rear wheel, and said stabilizer bar second end is spaced the first distanced from said second mid wheel and the second distance from said second rear wheel.

19. The vehicle according to claim 18, wherein said first distance is different than said second distance.

20. The vehicle according to claim 18, wherein the first and third cushions have a first spring rate and the second and fourth cushions have a second spring rate.

21. The vehicle according to claim 20, wherein said first spring rate is equal to said second spring rate.

22. The vehicle according to claim 20, wherein said first spring rate is different than said second spring rate.

23. The vehicle according to claim 21, wherein said stabilizer bar has a spring rate, and wherein a wheel rate, which is the spring rate on each wheel applied by the associated cushion and the stabilizer bar, is equal for each of the wheels.

24. The vehicle according to claim 22, wherein said stabilizer bar has a spring rate, and wherein a wheel rate, which is the spring rate on each wheel applied by the associated cushion and the stabilizer bar, is equal for each of the wheels.

* * * * *